April 6, 1926.

R. C. MONTEAGLE

VALVE

Filed March 30, 1925

1,579,776

INVENTOR.
Robert C. Monteagle
BY
Miller, Henry & Boykin
ATTORNEY.

Patented Apr. 6, 1926.

1,579,776

UNITED STATES PATENT OFFICE.

ROBERT C. MONTEAGLE, OF BURLINGAME, CALIFORNIA.

VALVE.

Application filed March 30, 1925. Serial No. 19,254.

*To all whom it may concern:*

Be it known that I, ROBERT C. MONTEAGLE, citizen of the United States, residing at Burlingame, county of San Mateo, State of California, have invented new and useful Improvements in Valves, of which the following is a specification.

My invention has for its particular object improvements in valve mechanism whereby conventional forms of packing are avoided.

These objects I attain by introducing ground surfaces between the valve stem operating portions and the stationary operating portion whereby a leak-proof but freely operable connection is attained.

By referring to the accompanying drawing my invention will be made clear.

Figure 4:
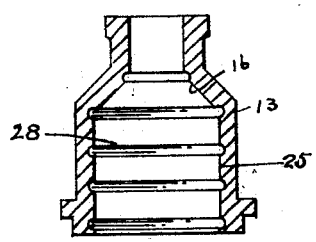
Fig. 4 is a detailed section of a portion of Fig. 1 showing the stationary member within which the stem actuating member is rotated in ground joint relation.
Figure 1:
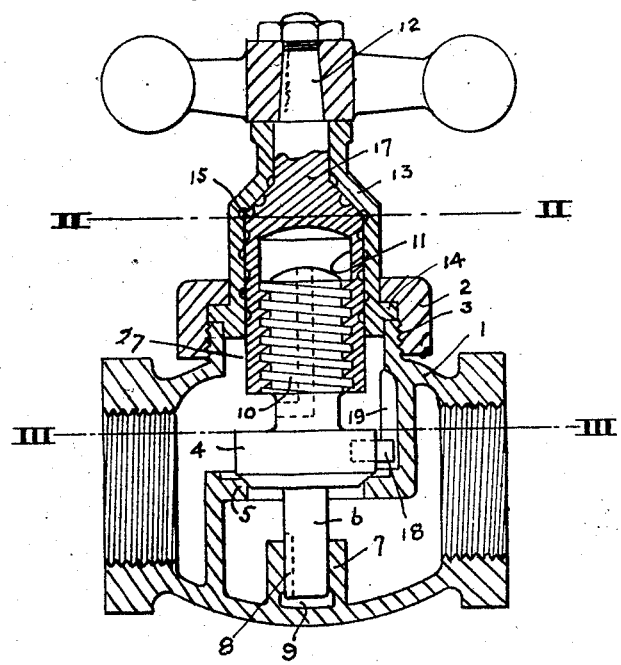
Fig. 1 illustrates one conventional form of valve to which my invention has been applied.
Figure 3:
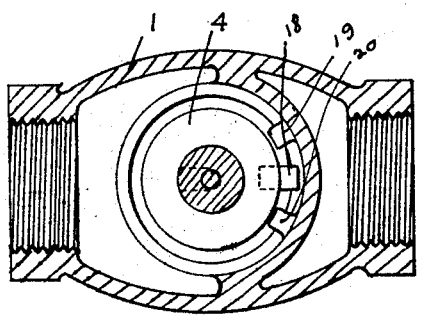
Fig. 3 is a cross section of the valve of Fig. 1 on the line III—III thereof.
Figure 2:
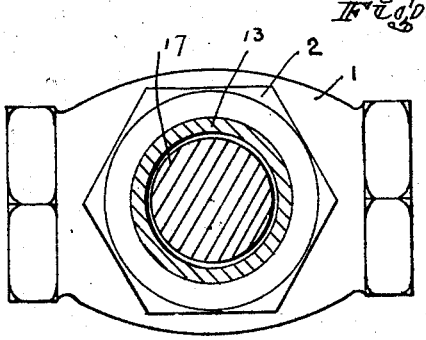
Fig. 2 is a cross section of Fig. 1 on the line II—II thereof.

A conventional valve body is indicated by the numeral 1 having the flanged collar 2 engaging with the body by the screw threads 3.

At 4 is a valve disc seating in the valve body at 5 and preferably having a guiding stem portion 6 engaged in the boss 7.

A passage 8 is cut through the stem or the boss so as to prevent the compression of fluid in the space 9.

The valve disc is provided with a threaded stem 10 engaging threads within the rotative member 11 which latter extends upward and engages the hand operable portion 12.

A stationary bonnet member 13 is engaged between the collar 2 and the body 1 as by the flange 14, and has a cylindrical portion 25 and an angular ground surface 16.

The rotative member 11 is provided on its upper portion with a tapering or angular ground portion 15, and a cylindrical portion 27 adapted to rotate within the cylindrical portion 25 of member 13.

These two angular or tapering surfaces 16 and 15 are ground together forming a tight joint preventing pressure from the interior of the body escaping between the stationary and rotative portions.

The operation is as follows:

The valve 4 is forced down upon its seat by rotating the hand operable portions 12 which rotate the stem memebr 17 about the threads 10.

During this operation the valve 4 is restrained from rotative movement by the pin 18 acting between the lugs 19, 20.

The valve will therefore be forced down upon the seat portion 5 and through the compression thereon the tapering surfaces 15, 16 will be forced together over their ground tapering portions, thus completely closing against liquid pressures any leakage from the interior of the valve through the joint between the rotative and stationary portions.

I prefer to form a series of grooves, one of which is shown at 28, in the cylindrical portions of either or both of the stationary portion 13 or rotative portion 17 for the purpose of collecting sediment and retarding flow during the valve operation.

I claim:

In a valve of the character described a tubular bonnet with a valve operating stem fitting therein and extending therethrough, and a series of circumferential grooves on the confronting surfaces of the stem and bonnet respectively, the grooves in the bonnet being staggered in relation to the grooves on the stem.

ROBERT C. MONTEAGLE.